US009527042B2

(12) United States Patent
Takagi et al.

(10) Patent No.: US 9,527,042 B2
(45) Date of Patent: Dec. 27, 2016

(54) SEPARATION MEMBRANE FOR WATER TREATMENT AND PRODUCTION METHOD FOR SAME

(75) Inventors: Kentaro Takagi, Otsu (JP); Masakazu Koiwa, Otsu (JP); Masahiro Kimura, Otsu (JP); Yutaro Suzuki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 455 days.

(21) Appl. No.: 13/979,096

(22) PCT Filed: Jan. 26, 2012

(86) PCT No.: PCT/JP2012/051618
§ 371 (c)(1),
(2), (4) Date: Jul. 10, 2013

(87) PCT Pub. No.: WO2012/105397
PCT Pub. Date: Aug. 9, 2012

(65) Prior Publication Data
US 2013/0284664 A1    Oct. 31, 2013

(30) Foreign Application Priority Data

Jan. 31, 2011  (JP) ................. 2011-018073

(51) Int. Cl.
*B01D 67/00*  (2006.01)
*B01D 69/08*  (2006.01)
(Continued)

(52) U.S. Cl.
CPC .............. *B01D 69/08* (2013.01); *B01D 63/10* (2013.01); *B01D 67/0009* (2013.01);
(Continued)

(58) Field of Classification Search
CPC ....... B01D 29/46; B01D 25/001; B01D 37/02;
B01D 29/012; B01D 29/111; B01D 3/10;
B01D 67/0009; B01D 69/12; B01D 69/08;
B01D 69/06; B01D 71/56; B01D 63/10;
B01D 2323/30; B01D 67/0011; B01D
67/0013; B01D 67/0018; C02F 1/44
See application file for complete search history.

(56) References Cited

U.S. PATENT DOCUMENTS 4,005,012 A * 1/1977 Wrasidlo ...................... 210/654
4,200,726 A * 4/1980 Ishii et al. ....................... 528/99
(Continued)

FOREIGN PATENT DOCUMENTS

JP   63-12310 A   1/1988
JP   6-47260 A    2/1994
(Continued)

OTHER PUBLICATIONS

Liu et al. Acid-Resistant composite reverse osmosis film. English language machine translation of CN 101785974 generated on Apr. 23, 2015.*

(Continued)

*Primary Examiner* — David C Mellon
(74) *Attorney, Agent, or Firm* — Birch, Stewart, Kolasch & Birch, LLP

(57) ABSTRACT

A separation membrane for water treatment, comprising a porous layer that is obtained by a phase separation method using a solution containing a resin and at least one of either an N,N-disubstituted isobutylamide or an N-monosubstituted isobutylamide.

10 Claims, 2 Drawing Sheets

(51) Int. Cl.
    *B01D 63/10*    (2006.01)
    *B01D 69/12*    (2006.01)
    *B01D 71/56*    (2006.01)
    *C02F 1/44*     (2006.01)
    *B01D 69/06*    (2006.01)

(52) U.S. Cl.
    CPC ...... *B01D 67/0011* (2013.01); *B01D 67/0013* (2013.01); *B01D 69/06* (2013.01); *B01D 69/12* (2013.01); *B01D 71/56* (2013.01); *C02F 1/44* (2013.01); B01D 67/0018 (2013.01); B01D 2323/30 (2013.01)

(56) References Cited

U.S. PATENT DOCUMENTS

| | | | |
|---|---|---|---|
| 5,258,203 | A | 11/1993 | Arthur |
| 5,662,852 | A * | 9/1997 | Kampschulte ......... C08G 69/32 264/184 |
| 2010/0294713 | A1* | 11/2010 | Tsuzawa et al. ............... 210/491 |

FOREIGN PATENT DOCUMENTS

| | | |
|---|---|---|
| JP | 9-85068 A | 3/1997 |
| JP | 2001-179061 A | 7/2001 |
| JP | 2003-201364 A | 7/2003 |
| JP | 2003-208820 A | 7/2003 |
| JP | 2005-186059 A | 7/2005 |
| JP | 2005-246207 A | 9/2005 |

OTHER PUBLICATIONS

Shailesh et al. Transport studies of uranium across a supported liquid membrane containing N,N-di(2-ethylhexyl) isobutyramide (D2EHIBA) as the carrier, Journal of Membrane Science 272 (2006) 143-151.*

International Search Report for PCT/JP2012/051618 dated May 15, 2012.

* cited by examiner

SEPARATION MEMBRANE FOR WATER TREATMENT AND PRODUCTION METHOD FOR SAME

TECHNICAL FIELD

The present invention relates to separation membranes useful for the selective separation of liquid mixtures, in particular separation membranes that not only combine high solute removal performance and high permeability but also can be advantageously used for solute removal, as well as manufacturing methods therefor.

BACKGROUND ART

In recent years, separation membranes have been in use in diverse fields, encompassing, among other things, water treatment, including drinking water production, water purification treatment and wastewater treatment, and the food industry. In the water treatment field, including drinking water production, water purification treatment and wastewater treatment, separation membranes are used to remove impurities from water as an alternative to conventional sand filters and coagulation precipitation systems. In the food industry, separation membranes are used for the separation and removal of yeast utilized in fermentation and concentration of liquids.

Areas in which separation membranes, capable of a selective separation of components from liquid mixtures, are widely used include: the manufacture of ultrapure water, desalination of seawater or brackish water, establishment of a closed industrial water supply system based on the removal or separation/recovery of components from dyeing or electrodeposition painting effluent, and concentration of active ingredients in the food industry.

In concrete terms, separation membranes in which a separation functional layer comprising a cross-linked polyamide obtained through an interfacial polycondensation reaction between a polyfunctional amine and polyfunctional acid derivative (e.g. a chloride) is deposited over a porous film are a focus of attention because of their high permeability and selective separation performance. From an economic viewpoint, separation membranes that are in use in various fields are required to have excellent permeability. This is because excellent permeability is conducive to compact equipment and savings in plant costs and advantageous in terms of the cost of membrane replacement and size of the required site area.

However, practical requirements for separation membranes have been growing in sophistication each year, and this has given rise to calls for the development of high-permeability separation membranes that tolerate low-pressure operation while maintaining high solute removal performance from the viewpoint of energy conservation. In response to such calls, it has been proposed to remove acidic substances, produced in an interfacial polycondensation reaction, outside the system through the addition of compounds such as potassium hydroxide and trisodium phosphate, addition of an acylation catalyst or addition of compounds with a solubility parameter of 8 to 14 $(cal/cm^3)^{0.5}$ as a means to achieve high permeability (see patent documents 1 to 4). Other known methods relating to a separation membrane featuring a cross-linked polyamide polymer include contact treatment with a chlorine-containing aqueous solution (see patent document 5) and contact treatment with a nitrous acid-containing aqueous solution (see patent document 6).

PRIOR ART DOCUMENTS

Patent Documents

Patent document 1: Japanese Unexamined Patent Publication (Kokai) No. SHO 6 3-12310, Official Gazette
Patent document 2: Japanese Unexamined Patent Publication (Kokai) No. HEI-6-47260, Official Gazette
Patent document 3: Japanese Unexamined Patent Publication (Kokai) No. HEI-9-85068, Official Gazette
Patent document 4: Japanese Unexamined Patent Publication (Kokai) No. 2001-179061, Official Gazette
Patent document 5: Japanese Unexamined Patent Publication (Kokai) No. 2005-246207, Official Gazette
Patent document 6: Japanese Unexamined Patent Publication (Kokai) No. 2005-186059, Official Gazette

SUMMARY OF THE INVENTION

Problems to be Solved by the Invention

Conventional methods have problems in that they increase the economic burden and wastewater burden load by increasing the amount of chemicals needed for membrane production.

The present invention aims to provide separation membranes capable of reducing such burdens, as well as manufacturing methods therefor.

Means of Solving the Problems

To achieve the above aim, separation membranes of the present invention feature a porous layer obtained by a phase separation method from a solution containing a resin and at least either N,N-disubstituted isobutylamide and or N-monosubstituted isobutylamide.

Effect of the Invention

The present invention makes it possible to obtain separation membranes that combine high permeability and high solute removal performance without the use of new additives or a post-membrane production modification treatment step. By eliminating the need for a modification treatment step, the present invention also makes it possible to reduce chemicals costs and wastewater treatment loads and obtain separation membranes using a simple and safe method.

DESCRIPTION OF EMBODIMENTS

Embodiments of the present invention are described below.

I. Separation Membrane

<Overview of Separation Membrane Configurations>

A separation membrane is capable of separating components contained in source fluid. A separation membrane may, for instance, feature (i) a substrate, a separation functional layer and a porous layer placed between the substrate and separation functional layer. A separation membrane may also be configured from (ii) a substrate and a porous layer deposited over the substrate or (iii) a porous layer alone without a substrate. In a separation membrane as described in (ii) or (iii), the porous layer separates the components contained in the source fluid, and this porous layer may have the same structure as the porous layer in the separation membrane described in (i).

The separation membrane described in (i) above is, for instance, advantageously used in reverse osmosis, forward osmosis, and nanofiltration. The separation membranes described in (ii) and (iii) above, on the other hand, are advantageously used in sewage treatment and other applications, and separate the components contained in the source fluid by porous layer.

Figure 1:
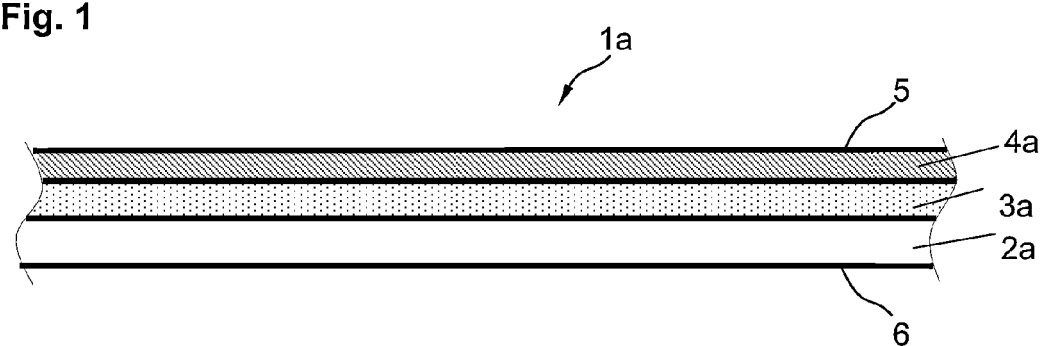
FIG. 1 Is a cross-sectional view illustrating an example of the separation membrane configuration of the present invention.
Figure 2:
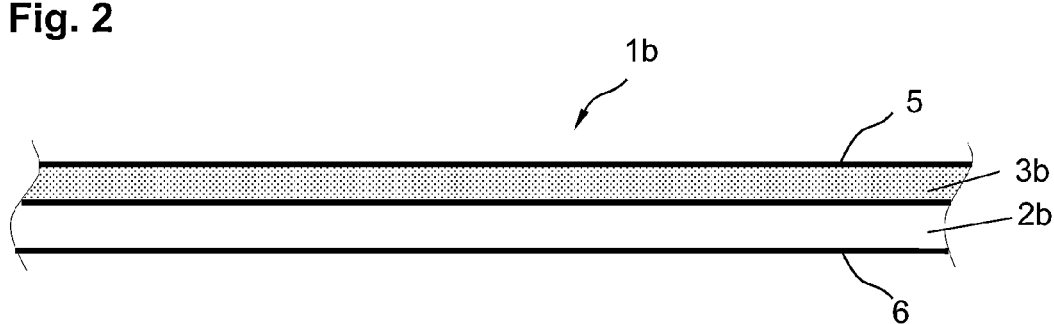
FIG. 2 Is a cross-sectional view illustrating another example of the separation membrane configuration of the present invention.
Figure 3:
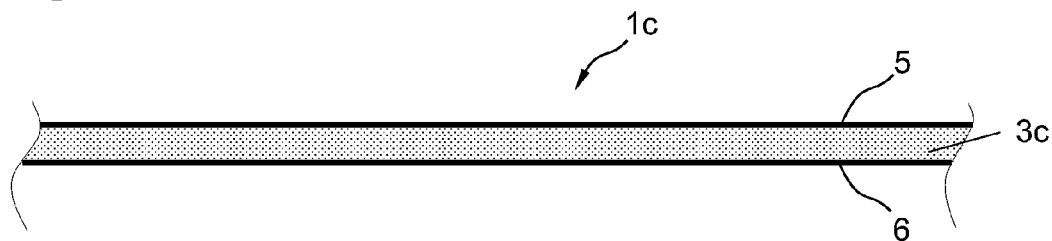
FIG. 3 Is a cross-sectional view illustrating another example of the separation membrane configuration of the present invention.

FIGS. 1 to 3 illustrate, respectively, the configurations of the separation membranes described in (i) to (iii) above.

As illustrated in FIG. 1, the separation membrane 1a features a substrate 2a, a separation functional layer 4a, and a porous layer 3a placed between the substrate 2a and the separation functional layer 4a.

As illustrated in FIG. 2, the separation membrane 1b features a substrate 2b and a porous layer 3b deposited over the substrate 2b.

As illustrated in FIG. 3, the separation membrane 1c features a porous layer 3c. As stated above, the porous layers 3b and 3c may have the same structure as the porous layer 3a. The substrate 2b may have the same structure as the substrate 2a.

The surface of a separation membrane found on its separation functional layer side is illustrated as the supply-side surface 5, while the surface found on its substrate side is illustrated as the permeate-side surface 6. After the source fluid is fed to the supply-side surface 5, it is separated into a permeate fluid that permeates the separation membrane and travels towards the surface-6 side and a concentrate fluid that stays on the surface-5 side of the separation membrane. Separation membranes of the present invention may take either the flat-type configuration or the hollow fiber-type configuration according to the water quality of the source fluid or the operation method.

<Separation Functional Layer Under Membrane Configuration in (i)>

In a separation membrane configured as (i) above, the separation functional layer uses a cross-linked polymer from the viewpoint of, for instance, pore size control and durability. In concrete terms, a polyamide separation functional layer produced by having polyfunctional amines and polyfunctional acid halides undergo polycondensation over the porous layer as described later, an organic-inorganic hybrid functional layer, or the like is advantageously used from the viewpoint of separation performance.

The separation functional layer in the separation membrane described in (i) above may contain a polyamide as the main component. This separation membrane is advantageously used for the production of drinking water from, for instance, seawater, brackish water or water containing harmful substances or the manufacture of industrial ultrapure water. The polyamide may, for instance, be a polycondensate between polyfunctional amines and polyfunctional acid halides.

For the purpose of the present description, "composition X contains substance Y as the main component" may mean that the content (concentration) of substance Y in composition X is 50 wt % or more, 60 wt % or more, or 80 wt % or more or that composition X consists virtually of substance Y alone. The concept of a composition encompasses a mixture, complex, compound, and the like.

Examples of the constitution of a polyamide and those of polyfunctional amines and polyfunctional acid halides are shown in the section for manufacturing methods. From the viewpoint of chemical resistance, the separation functional layer that forms part of the separation membrane described in (i) above may have an organic-inorganic hybrid structure containing the element Si, etc. Although there are no specific restrictions on the composition of the separation functional layer with an organic-inorganic hybrid structure, it may contain, for instance, a polymer of (A) a silicon compound in which a reactive group containing an ethylenically unsaturated group and a hydrolysable group are directly bonded to a silicon atom and/or (B) a compound containing an ethylenically unsaturated group other than the above silicon compound.

In concrete terms, the separation functional layer may contain at least one type of polymer out of A polymer formed as a result of compound (A) alone undergoing condensation and/or polymerization, A polymer formed as a result of compound (B) alone undergoing polymerization, and A copolymer of compound (A) and compound (B).

Such a polymer may contain any condensate. In a copolymer of compound (A) and compound (B), compound (A) may condense via a hydrolysable group. Compound (B) may polymerize via an ethylenically unsaturated group.

The compound (A) content of the separation functional layer is preferably 10 wt % or more, more preferably 20 wt % or more and 50 wt % or less. The compound (B) content of the separation functional layer is preferably 90 wt % or less, more preferably 50 wt % or more and 80 wt % or less. The compound (A)/compound (B) weight ratio is preferably 1/9 or more and 1/1 or less. As long as compound (A) and compound (B) are within those ranges, a relatively high degree of cross-linking can be obtained in the polymerization condensation products contained in the separation functional layer, and this limits the leaching of components from the separation functional layer during membrane filtration, resulting in the achievement of stable filtration performance.

Compound (A), compound (B) and other compounds sometimes contain spontaneously formed polymers (including condensates) and similar compounds. For this reason, when talking about, for instance, "the compound (A) content of the separation functional layer", compound (A) includes such components of polymerization condensation products as to be derived from compound (A). The same thing applies to compound (B) and other compounds.

In addition to compound (A), the separation functional layer may contain components derived from silicon compound (C), which contains a hydrolysable group, but not a reactive group containing an ethylenically unsaturated group. Examples of compound (C) will be provided later.

Such components may be condensates derived from compound (C) alone or condensates derived from copolymers with compound (A) and compound (B).

In the separation membrane described in (i) above, the thickness of the separation functional layer may be measured, mutatis mutandis, in accordance with membrane thickness measurement methods for conventional separation membranes based on, for instance, an embedment of the separation membrane in a resin, followed by the preparation of ultrathin slices, dyeing and other treatments, and observation using a transmission electron microscope. When the separation functional layer has a folded structure, the main measurement procedure goes like this: one of the folds is measured in the cross-sectional lengthwise direction of the folded structure located above the porous layer at 50 nm intervals, and this is repeated for a total of 20 folds, with the average of the measurements designated as the thickness. There are no specific restrictions on the thickness of any of the separation functional layers.

Although the thickness of the separation functional layer may be changed according to the application of the separation membrane, it is preferable that it be 5 nm or more and 3000 nm or less from the viewpoint of separation performance and permeation performance and more preferably 5 nm or more and 300 nm or less from the viewpoint, particularly, of permeation performance.

<Porous Layer>

In a separation membrane configured as (i) above, the porous layer provides the separation membrane with mechanical strength. Although there are no specific restrictions on the size and distribution of pores across the porous layer, the porous layer does not have to exhibit separation performance for ions and other molecular size components. In concrete terms, the porous layer can be anything as long as it meets the general description "porous film", including, for instance, a layer with fine uniform pores or fine pores that gradually increase in size from one of the surfaces on which side a separation functional layer is formed to the other surface. The preferable pore size of the porous layer is, on the surface on which side a separation functional layer is formed, 1 nm or more and 100 nm or less in terms of the equivalent diameters of pores based on a circular conversion of their projected areas as measured using an atomic force microscope, electron microscope, or the like. From the viewpoint of interfacial polymerization reaction performance and retainability of the separation functional film, it is preferable that the pore size be 3 nm or more and 50 nm or less in terms of the equivalent diameters of pores based on a circular conversion of their projected areas.

Although there are no specific restrictions on the thickness of the porous layer, it is preferable that it be in the 20 µm to 500 µm range from the viewpoint of the strength of the separation membrane, more preferably in the 30 µm to 300 µm range.

It is preferable that the material of the porous layer be polysulfone, polyacrylonitrile, polyamide, polyester, polyvinyl alcohol, polyphenylene sulfide sulfone, polyphenylene sulfone, polyphenylene sulfide, polyethersulfone, polyvinylidene fluoride, cellulose acetate, polyvinyl chloride, and a mixture or laminate thereof. From the viewpoint of chemical, mechanical and thermal stability and pore size controllability, polysulfone (PSf) is preferable.

[Chemical formula 1]

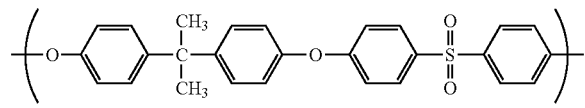

The porous layer may contain such resins as main components.

The porous layer is formed by turning a polymer solution created by dissolving the above material into a solvent containing at least either N,N-disubstituted isobutylamide or N-monosubstituted isobutylamide into a porous medium using a phase separation method as described later. The chemical formulas of an N,N-disubstituted isobutylamide and N-monosubstituted isobutylamide are shown below.

[Chemical formula 2]

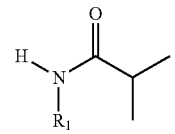

Chemical formula 3]

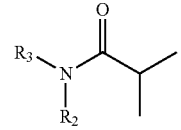

(In the above formulas, $R_1$, $R_2$ and $R_3$ are a linear alkyl group with a carbon number of 1 or more and 10 or less, branched alkyl group with a carbon number of 3 or more and 10 or less, linear alkyl group with a carbon number of 2 or more and 10 or less containing a double bond, branched alkyl group with a carbon number of 3 or more and 10 or less containing a double bond, or substituent group expressed as $-(CH_2)_n-R_4$ (where n is an integer ranging from 0 to 3 and $R_4$ is a cycloalkyl group or aryl group with a carbon number of 3 or more and 8 or less).)

Concrete examples of an N,N-disubstituted isobutylamide and N-monosubstituted isobutylamide and details about the solvent for the polymer solution are provided hereinafter. Next, the porous layer that forms part of the separation membrane described in (ii) and (iii) above is described in detail.

Formed from the same material as the porous layer in (i) above, the porous layer featuring in the separation membrane described in (ii) or (iii) above is not subject to any specific restrictions, as long as it possesses a separation function and mechanical strength. As main components of the porous layer, polyvinyl chloride, polyvinylidene fluoride, polysulfone, polyethersulfone, and the like are preferable because of the ease they provide in the solution-based production of membranes, as well as their excellent physical durability and chemical resistance.

Notwithstanding the membrane configurations specified in (ii) and (iii) above, the porous layer is formed in the same manner as the porous layer in (i) above, namely by turning a polymer solution created by dissolving the above material into a solvent containing at least either N,N-disubstituted isobutylamide or N-monosubstituted isobutylamide into a porous medium using a phase separation method.

In the separation membrane described in (ii) or (iii) above, it is preferable that the average pore size of the porous layer at one of the surfaces be at least twice as large as the average pore size at the other surface.

In the case of a separation membrane with a configuration shown in (ii) or (iii) above, the thickness of the porous layer is preferably 1 µm or more and 500 µm or less, more preferably 5 µm or more and 200 µm or less. If the thickness of the porous layer is 1 µm or more, the porous layer is resistant to the generation of cracks and other defects and this helps maintain filtration performance. If the thickness of the porous layer is 500 µm or less, good permeation performance can be maintained.

The structure of the porous layer can be observed using a scanning electron microscope, transmission electron microscope, or atomic force microscope. When using a scanning electron microscope, for instance, a sample is taken by just cutting the separation membrane using the freeze-fracture method in the case of a separation membrane from (iii) above and doing so after peeling the porous layer from the substrate (nonwoven fabric) in the case of a separation membrane from (i) or (ii) above to subject it to a cross-sectional observation. After being thinly coated with platinum, platinum-palladium or ruthenium tetrachloride, preferably ruthenium tetrachloride, the sample is observed at an acceleration voltage of 3 kV or more and 6 kV or less using an ultra-high resolution field-emission scanning electron microscope (UHR-FE-SEM). Available models of an ultra-high resolution field-emission scanning electron microscope include the S-900 supplied by Hitachi, Ltd. From the obtained electron microscope photograph, the thickness of the porous layer and the equivalent diameter of the surface pores based on a circular conversion of their projected areas are determined. The obtained thickness of the porous layer and pore size are average values. In concrete terms, the thickness of the porous layer is the average of 20 measurements taken at 20 μm intervals across the cross section in the direction perpendicular to the thickness direction. The pore size is the average of the equivalent diameters of 200 pores based on a circular conversion of their projected areas.

<Substrate>

As the substrate, a nonwoven fabric (fibrous substrate) may be used from the viewpoint of providing optimum mechanical strength while maintaining the separation performance and permeation performance of the separation membrane.

As the nonwoven fabric, one based on polyolefin, polyester, cellulose or the like is used, with a polyolefin or polyester-based nonwoven fabric preferred from the viewpoint of shape retainability. A mixture of two or more materials may also be used.

As the substrate, a long-fiber nonwoven fabric or short-fiber nonwoven fabric may be advantageously used. It is preferable that the substrate meet conditions such as not easily allowing a polymer solution to reach its back side (permeate side) when the solution is flow cast over it, not easily allowing the porous layer to peel, and not easily causing unevenness to the separation membrane or the generation of flaws, such as pinholes, in it due to fluffing, etc. For these reasons, a long-fiber nonwoven fabric is particularly preferably used as the substrate. Examples of such a substrate include a long-fiber nonwoven fabric made of thermoplastic continuous filaments. In view of the fact that the continuous production of separation membranes involves the application of a tension in the direction of membrane production, it is preferable that a long-fiber nonwoven fabric with excellent dimensional stability be used as the substrate. In a separation membrane configured as (i) above, in particular, a polyester long-fiber nonwoven fabric is preferable from the viewpoint of strength and cost.

It is preferable that, in terms of strength, the fibers of the long-fiber nonwoven fabric in the surface layer opposite to the porous layer be more longitudinally oriented than the fibers in the surface layer next to the porous layer. Such a structure makes it possible to maintain strength and effectively limit membrane tearing and other damage. In concrete terms, it is preferable that the fiber orientation angle of the long-fiber nonwoven fabric in the surface layer opposite to the porous layer be 0° or more and 25° or less and that its difference from the fiber orientation angle in the surface layer next to the porous layer be 10° or more and 90° or less.

The separation membrane manufacturing process includes a heating step. Heating causes shrinkage in the porous layer or separation functional layer. Shrinkage is more pronounced in the width direction, which was not subjected to the application of a tension during continuous membrane production. Since shrinkage gives rise to a problem in dimensional stability and the like, the substrate is required to have a low rate of thermally induced dimensional change. If the difference between the fiber orientation angle in the surface layer of a nonwoven fabric opposite to the porous layer and the fiber orientation angle in its surface layer next to the porous layer is 10° or more and 90° or less, it is possible to limit the rate of thermally induced dimensional change.

Here, the fiber orientation angle is an indicator of the fiber direction of a nonwoven fabric substrate that forms part of a separation membrane. It denotes the average angle made by the fibers that constitute a nonwoven fabric substrate when the direction of membrane production during continuous membrane production and the direction perpendicular to the direction of membrane production, namely the width direction of the nonwoven fabric substrate, are defined as 0° and 90°, respectively. The closer the fiber orientation angle to 0°, the more longitudinally oriented the substrate, and the closer the fiber orientation angle to 90°, the more transversally oriented it is.

The fiber orientation angle can be measured as follows: Ten small pieces are randomly sampled from the nonwoven fabric and their surfaces are photographed at a magnification ratio of 100× to 1000× using a scanning electron microscope. Based on the photographic images taken, the angles of a total of 100 fibers, i.e. 10 from each sample, are measured on a scale where the length direction of the nonwoven fabric (longitudinal direction and membrane production direction) is 0° and the width direction of the nonwoven fabric (transverse direction) is 90°. The average of those measurements is calculated, rounded to the nearest whole number, to obtain the fiber orientation angle.

The substrate, porous layer and separation functional layer that constitute a separation membrane may contain, in addition to the components described above, additives such as a coloring agent, antistatic agent and plasticizer by 5 wt % or less, 2 wt % or less, and 1 wt % or less.

<Permeate Flux>

It is preferable that the performance of the separation membranes described above be such that they exhibit a permeate flux of 0.7 m$^3$/m$^2$/day or more when seawater with a temperature of 25° C., a pH of 6.5 and a TDS concentration of 3.5 wt % is passed through them at an operating pressure of 5.5 MPa. It is also preferable that, under the same conditions, the separation membranes exhibit a permeate flux of 1.4 m$^3$/m$^2$/day or less. Any separation membrane exhibiting a permeate flux that falls within this range is advantageously used for water treatment purposes.

II. Separation Membrane Manufacturing Methods

1. Manufacture of Separation Membrane

<Formation of Porous Layer>

As described above, a porous layer is produced by turning a resin-containing solution based on at least either N,N-disubstituted isobutylamide or N-monosubstituted isobutylamide into a porous medium using a phase separation method.

To achieve phase separation, a generally known method, such as non-solvent-induced phase separation and thermally induced phase separation, may be used. Non-solvent-induced phase separation is a phenomenon in which the permeation into a polymer solution of a non-solvent of this polymer causes the polymer solution to separate into a polymer-thick phase and a polymer-thin phase. Eventually, the polymer-thick phase becomes the wall of a separation membrane, while the polymer thin-phase becomes pores of the separation membrane. Generally speaking, a good solvent capable of dissolving a polymer at room temperature is used for the preparation of a polymer solution, with a non-solvent incapable of dissolving the polymer employed as a coagulant.

When manufacturing a separation membrane using non-solvent-induced phase separation, a non-solvent of the polymer chosen as the material constituting the porous layer is brought into contact with the polymer solution (stock solution for membrane production) to have the polymer solution undergo phase separation. Here, a method to delay non-solvent-induced phase separation by, for example, mixing a small amount of a good solvent into a non-solvent or using a low-temperature non-solvent may be employed to give the desired pore size or number of pores to the separation membrane.

Thermally induced phase separation is a phenomenon in which a solution created by uniformly dissolving a polymer in a solvent at a high temperature separates into a polymer phase and a solvent phase as it cools down due to the precipitation of the polymer resulting from the diminished solubility of the solvent at low temperatures. To achieve thermally induced phase separation, it is necessary to choose a suitable solvent that uniformly dissolves a polymer at high temperatures and precipitates it at low temperatures. As such a solvent, one called a "poor solvent", which does not dissolve a polymer at room temperature but dissolves it at high temperatures, for instance, 100° C. or more, is generally used. In this regard, it is possible to create a poor solvent from a good solvent by mixing a chosen amount of a non-solvent into it.

Under the present invention, either phase separation method may be utilized. Of the two, thermally induced phase separation is preferably used when producing a homogeneous separation membrane.

To provide a concrete example of a method to form a porous layer, the non-solvent-induced phase separation method, encompassing a step to dissolve a resin into a solvent, step to cast the obtained resin solution over a substrate and step to bring this resin solution and a non-solvent into contact, is now described. In this method, a film of a polymer solution containing the above resin and solvents is first formed over the surface of a substrate (e.g., a nonwoven fabric), with the substrate impregnated with the polymer solution at the same time. The film-covered substrate is then brought into contact with a coagulating bath containing a non-solvent to coagulate the resin and thereby form a porous layer over the surface of the substrate. It is preferable that the temperature of the polymer solution be, under normal circumstances, selected from the 0 to 120° C. range from the viewpoint of membrane production performance.

The type of resin is as specified above.

In a polymer solution, the concentration of the resin is preferably 5 wt % or more or 8 wt % or more. In a polymer solution, the concentration of the resin is also preferably 40 wt % or less or 25 wt % or less. If the concentration of the resin is 5 wt % or more, it is easier to obtain a porous layer with a suitable strength, while if it is 40 wt % or less, it is easier to obtain a separation membrane with a suitable permeability.

The solvents contained in a polymer solution are designed to dissolve a resin. The solvents encourage the formation of a porous layer by acting on the resin and pore opening agent. The polymer solution contains at least either of the above N,N-disubstituted isobutylamide and N-monosubstituted isobutylamide as solvents. Containing such solvents makes it possible to form a high-permeability separation membrane with a high-porosity porous layer.

Here, as the N,N-disubstituted isobutylamide, at least one compound chosen from the group consisting of N,N-dimethyl isobutyl amide, N,N-diisopropyl isobutyl amide and N,N-bis(2-ethylhexyl)isobutyl amide is applicable. Similarly, as the N-monosubstituted isobutylamide, at least one compound chosen from the group consisting of N-methyl isobutyl amide, N-butyl isobutyl amide, N-pentyl isobutyl amide, N-isopropyl isobutyl amide, N-phenyl isobutyl amide, N-benzyl isobutyl amide, N-(2-phenyl ethyl)isobutyl amide, N-vinyl isobutyl amide and N-(3-butenyl)isobutyl amide is applicable. Those compounds listed above may be used singly or as a mixture. Of all N,N-disubstituted isobutylamide compounds, N,N-dimethyl isobutyl amide (DMIB) is particularly preferable for its high chemical and thermal stability.

The polymer solution may, to the extent that it does not impair the effect of the present invention, contain organic solvents other than N,N-disubstituted isobutylamide and an N-monosubstituted isobutylamide. Of all organic solvents that can be mixed with N,N-disubstituted isobutylamide and N-monosubstituted isobutylamide, those with a high resin solubility are preferable. As such solvents, N-methyl-2-pyrolidone (NMP), N,N-dimethyl acetamide (DMAc), N,N-dimethyl formamide (DMF), dimethyl sulfoxide (DMSO), acetone, methyl ethyl ketone (MEK), and the like are available.

Although there are no specific numerical restrictions on the blend ratio between N,N-disubstituted isobutylamide and N-monosubstituted isobutylamide, on the one hand, and other organic solvents, on the other—namely, concentration (wt %) of N,N-disubstituted isobutylamide and N-monosubstituted isobutylamide/concentration (wt %) of other organic solvents—it is preferable that it be, for instance, 1/9 or more, 1/7 or more, 1/3 or more, 1/1 or more, or 2/1 or more. It is also preferable that the blend ratio be 9/1 or less, 7/1 or less, or 5/1 or less.

The solvent concentration of the polymer solution is preferably 40 wt % or more, 55 wt % or more, or 60 wt % or more. The solvent concentration of the polymer solution is also preferably 95 wt % or less, 94.9 wt % or less, or 90 wt % or less. If the solvent concentration is 40 wt % or more, the gelation of the polymer solution is suitably restricted, while, if it is 95 wt % or less, it is easier to obtain a porous layer with an optimum strength. Here, the solvent concentration means the sum total of the combined concentration of N,N-disubstituted isobutylamide and N-monosubstituted isobutylamide and the concentration of other organic solvent as described above in the polymer solution.

A pore opening agent may be added to the polymer solution. The pore opening agent has activity whereby it promotes pore formation as it is unleashed when the polymer solution is immersed in a coagulating bath. It is preferable that the pore opening agent have a high solubility in the coagulating bath. Inorganic salts, such as chloride calcium and calcium carbonate, may be used. Alternatively, the pore opening agent may be selected from polyoxyalkylenes, such as polyethylene glycol and polypropylene glycol, water-soluble polymers, such as polyvinyl alcohol, polyvinyl butyral and polyacrylic acid, and glycerin.

A non-solvent may also be added to the polymer solution. A non-solvent is a liquid that does not dissolve a resin. A non-solvent acts in such a way as to control the speed of the coagulation of the resin and the size of pores. Water and alcohol, e.g., methanol or ethanol, may be used as a non-solvent. Of these, water and methanol are preferable from the viewpoint of the ease of wastewater treatment and price. A mixture of two or more non-solvents may also be used as a non-solvent.

When adding a pore opening agent and non-solvent, it is preferable that the resin concentration and solvent concentration of the polymer solution be 5 wt % or more and 40 wt % or less and 40 wt % or more and 94.9 wt % or less, respectively. It is preferable that the pore opening agent concentration of the polymer solution be 0.1 wt % or more and 15 wt % or less, more preferably 0.5 wt % or more and 10 wt % or less. It is preferable that the non-solvent concentration of the polymer solution be 0 wt % or more and 20 wt % or less, more preferably 0.5 wt % or more and 15 wt % or less.

If the pore opening agent concentration is 0.1 wt % or more, a suitable permeability can be obtained. If, on the other hand, the pore opening agent concentration is 10 wt % or less, a porous layer with a suitable strength can be obtained. Furthermore, if the pore opening agent concentration is 10 wt % or less, it is harder for the pore opening agent to remain in the porous layer, and this limits the deterioration in the water quality of permeate water or variation in permeability due to the leaching of the residual pore opening agent during the use of the separation membrane.

As the coagulating bath, a liquid mixture containing non-solvents alone or non-solvents and solvents may be used. The solvent concentration of the coagulating bath may, for instance, be 5 wt % or more and 95 wt % or less, more specifically 10 wt % or more and 90 wt % or less. It is preferable that the coagulating bath contain non-solvents by at least 5 wt %. If the solvent concentration exceeds 95 wt % (namely, the non-solvent concentration is less than 5 wt %), it is harder for the resin to coagulate, and this sometimes hinders the formation of a porous layer. If, on the other hand, the solvent concentration is less than 5 wt % (namely, the non-solvent concentration is more than 95 wt %), the speed of resin coagulation becomes excessively large, and this sometimes leads to too small a pore size. Finally, if the solvent concentration is 95 wt % or less, the speed of resin coagulation is adequately controlled, and this ensures the stable formation of a porous layer.

The temperature of the coagulating bath can be used to control the coagulation speed. The temperature of the coagulating bath may, for instance, be 0 to 100° C., or 10 to 80° C.

No specific restrictions apply to the method to bring the substrate, covered with a polymer solution film, in contact with the coagulating bath. There are, for instance, a method in which the film-covered substrate is immersed in the coagulating bath, another in which the film-covered substrate is held upside down to bring its film-side surface into contact with the surface of the coagulating bath, and a third in which the film-covered substrate is first attached to a glass plate, metal plate or some other smooth surface via its back-side surface, i.e. the one opposite to the film-side surface, and is then immersed in the coagulating bath together with the plate so as to prevent the back-side surface of the substrate from being exposed to the coagulating bath. In the last method, the polymer-solution film may be formed before or after the substrate is attached to the plate.

The formation of a polymer-solution film over the substrate is carried out by coating the substrate with a polymer solution or immersing the substrate in a polymer solution. In the case of polymer solution coating, the substrate may be coated on one or both sides. In this regard, if a porous substrate with a density of 0.7 g/cm$^3$ or less is used, the polymer solution, depending on its composition, penetrates into the substrate to an optimum degree.

The amount of time that passes from the coating of the substrate with a polymer solution to contact with a coagulating bath is preferably in the range of 0.1 to 5 seconds. If the passage of time to contact with a coagulating bath is in this range, coagulation occurs after the polymer solution penetrates sufficiently into the inter-fiber space of the substrate, and this ensures strong bonding between the resin and the substrate by providing an anchoring effect.

A concrete method to ensure uniform formation is now described. A PSf resin solution of a predetermined concentration is prepared by dissolving a predetermined amount of PSf in DMIB. This solution is called a polymer solution or stock solution for membrane production. This polymer solution is then applied over the nonwoven fabric substrate as a coat with a roughly constant thickness and aired for a certain period to remove the solvent on the surface, followed by the coagulation of PSf in a coagulating solution. During this period, the surface and other sections that come into contact with the coagulating solution experience a swift evaporation of DMIB solvent and rapid coagulation of PSf, leading to the formation of joined pores as a result of the hollowing out of DMIB-rich regions.

In this regard, the evaporation of the DMIB solvent and coagulation of PSf described above progresses more slowly in the interior compared to the surface, leading to the creation of larger DMIB-rich regions and enlargement of the diameters of joined pores. Needless to say, since the conditions for the creation of DMIB-rich regions described above change gradually with the distance from the surface, the process results in the formation of a layer with a fuzzy pore size distribution without clear boundaries between pores. In this step, the average porosity and average pore size can be controlled by, among other things, adjusting the temperature of the polymer solution used, PSf concentration, relative humidity of the ambient air during coating, passage of time from coating to immersion in a coagulating solution, and temperature and composition of the coagulating solution.

The details of the step described above and conditions not mentioned in the present application may be found in, for instance, Office of Saline Water Research and Development Progress Report No. 359 (1968). To obtain a layer with the desired structure, however, the polymer concentration, solvent temperature, and type of poor solvent may be changed from the method contained in the above report.

Any porous layer obtained under such preferable conditions may be further improved in terms of the solute rejection performance of the separation membrane and membrane permeability by providing it with a hot-water treatment with a temperature range of 40° C. to 100° C., preferably 50° C. to 80, for 1 minute or more and 10 minutes or less, more preferably 2 minutes or more and 8 minutes or less. In the separation membrane described in (i) above, N,N-disubstituted isobutylamide and/or N-monosubstituted isobutylamide that have remained in the porous layer act as an acylation catalyst during the formation of a separation functional layer and promote interfacial polycondensation.

The amounts of N,N-disubstituted isobutylamide and/or any N-monosubstituted isobutylamide that have remained in the porous layer are measured in accordance with the procedure described below.

A 10×10 cm piece is cut out of the separation membrane. In the case of a separation membrane described in (i) or (ii) above, the resin casting is obtained by peeling the porous layer from the substrate to be used as a specimen. In the case of a separation membrane described in (iii) above, the cut-out piece is just used as a specimen. The specimen is immersed in 50 g of ethanol for 8 hours. After this, components that have dissolved into the ethanol are measured using a gas chromatograph, such as the Agilent (registered trademark) 1100 Series chromatograph from Agilent Technologies.

What is left of the specimen is taken out of the ethanol and dried by heating at 120° C. for 2 hours. It is then cooled to room temperature inside the desiccator and weighed.

Based on the results of those measurements, the amounts of N,N-disubstituted isobutylamide and N-monosubstituted isobutylamide contained in the unit weight of the separation membrane, excluding the substrate are calculated.

<Formation of Separation Functional Layer in (i)>

The separation functional layer in the separation membrane described in (i) above can be produced as described below.

A separation functional layer containing polyamides as its main components can be formed by having polyfunctional amines and polyfunctional acid halides undergo interfacial polycondensation over the porous layer. Here, it is preferable that at least either of polyfunctional amines or polyfunctional acid halides contain at least one tri- or more functional compounds.

Here, a polyfunctional amine is an amine that contains at least two primary and/or secondary amino groups, of which at least one is a primary amino group, in a single molecule.

Examples include aromatic polyfunctional amines, such as phenylene diamine, xylylene diamine, 1,3,5-triamino benzene, 1,2,4-triamino benzene, 3,5-diaminobenzoic acid, 3-aminobenzyl amine and 4-aminobenzyl amine—in which two amino groups are bonded to the benzene ring in the ortho, meta or para position, aliphatic amine, such as ethylene diamine and propylene diamine, and alicyclic polyfunctional amines, such as 1,2-diaminocyclohexane, 1,4-diaminocyclohexane, 4-aminopiperidine and 4-aminoethyl piperazine.

Taking into consideration the selective separation performance, permeability and heat resistance of the membrane, it is preferable that the polyfunctional amine be an aromatic polyfunctional amine containing 2 to 4 primary and/or secondary amino groups in a single molecule. As such a polyfunctional aromatic amine, m-phenylene diamine, p-phenylene diamine and 1,3,5-triamino benzene are advantageously used. Of these, m-phenylene diamine (hereinafter referred to as "m-PDA") is more preferable in terms of availability and ease of handling.

The polyfunctional amines may be used singly or in combination of two or more. When polyfunctional amines are used in combination of two or more, they may all be those listed above or contain one or more other amines containing at least two secondary amino groups in a single molecule. Examples of an amine containing at least two secondary amino groups in a single molecule include piperazine and 1,3-bispiperidyl propane.

A polyfunctional acid halide is an acid halide containing at least two halogenated carbonyl groups in a single molecule.

Examples of a trifunctional acid halide include trimesic acid chloride, 1,3,5-cyclohexane tricarboxylic acid trichloride, and 1,2,4-cyclobutane tricarboxylic acid trichloride. Examples of a bifunctional acid halide include an aromatic bifunctional acid halide, such as biphenyl dicarboxylic acid dichloride, azo benzene dicarboxylic acid dichloride, terephthalic acid chloride, isophthalic acid chloride or naphthalene dicarboxylic acid chloride, an aliphatic bifunctional acid halide, such as adipoyl chloride or sebacoyl chloride, and an alicyclic bifunctional acid halide, such as cyclopentane dicarboxylic acid dichloride, cyclohexanedicarboxylic acid dichloride or tetrahydrofuran dicarboxylic acid dichloride.

Taking into consideration reactivity with a polyfunctional amine, it is preferable that the polyfunctional acid halide be a polyfunctional acid chloride. Taking into consideration the selective separation performance and heat resistance of the membrane, it is preferable that the polyfunctional acid halide be a polyfunctional aromatic acid chloride containing 2 to 4 chloride carbonyl groups in a single molecule. Of these, trimesic acid chloride (TMC) is more preferable from the viewpoint of availability and ease of handling.

These polyfunctional acid halides may be used singly or in combination of two or more.

As a polyfunctional acid halide, a bifunctional acid halide and a trifunctional acid halide may be used. It is preferable that, in terms of maintaining the separation performance of the separation membrane, the molar ratio between bifunctional acid halides and the trifunctional acid halides, (moles of bifunctional acid halides/moles of trifunctional acid halides) be 0.05 or more and 1.5 or less, more preferably 0.1 or more and 1.0 or less.

A concrete method to form a polyamide layer as a separation functional layer is now described.

After coating the porous film with a polyfunctional amine aqueous solution, any superfluous amount of the amine aqueous solution is removed using an air knife or the like. The coated surface is further coated with a solution containing polyfunctional acid halides, with any superfluous amount of the polyfunctional acid halides removed using an air knife or the like.

After this, monomers may be removed through washing. A chemical treatment with chlorine, an acid, a base, nitrous acid, and the like may also be provided. The chemical treatment may take place before or after washing.

As a solvent for a solution containing polyfunctional acid halides, an organic solvent is used. It is desirable that such an organic solvent be immiscible with water, capable of dissolving polyfunctional acid halides, and not destructive of the porous layer, while being inactive with polyfunctional amine compounds and polyfunctional acid halides. Preferable examples include hydrocarbons, such as n-hexane, n-octane and n-decane.

Next, the formation of a separation functional layer that has an organic-inorganic hybrid structure containing the element Si, etc. is described. As described above, the separation functional layer with an organic-inorganic hybrid structure can be obtained through at least either of reaction of the condensation of compound (A) and polymerization of compound (A) and compound (B).

First, compound (A) is described.

The reactive group containing an ethylenically unsaturated group is directly bonded to a silicon atom. Examples of such a reactive group include a vinyl group, allyl group, methacryloxyethyl group, methacryloxypropyl group, acryloxyethyl group, acryloxypropyl group and styryl group.

From the viewpoint of polymerizability, a methacryloxypropyl group, acryloxypropyl group and styryl group are preferable.

Compound (A) becomes a polymer based on siloxane bonding of silicon compounds as a result of a condensation reaction, preceded by a process in which hydrolysable groups directly bonded to silicon atoms were transformed into hydroxyl groups.

Examples of a hydrolysable group include an alkoxy group, alkenyloxy group, carboxy group, ketoxime group, aminohydroxy group, halogen atom, isocyanate group and other functional groups. It is preferable that an alkoxy group have a carbon number of 1 to 10, more preferably 1 to 2. It is preferable that an alkenyloxy group have a carbon number of 2 to 10, more preferably 2 to 4, and even more preferably 3. It is preferable that a carboxy group have a carbon number of 2 to 10, more preferably 2, namely an acetoxy group. Examples of a ketoxime group include a methyl ethyl ketoxime group, dimethyl ketoxime group and diethyl ketoxime group. In an aminohydroxy group, an amino group is bonded to a silicon atom via an oxygen atom. Examples of such an aminohydroxy group include a dimethyl aminohydroxy group, diethyl aminohydroxy group and methyl ethyl aminohydroxy group. As a halogen atom, a chlorine atom is preferably used.

The formation of a separation functional layer may also be based on the use of a silicon compound in which some of the above hydrolysable groups take a silanol structure as a result of hydrolysis. Two or more silicon compounds that have moderately polymerized without cross-linking as a result of some hydrolysable groups undergoing hydrolysis and condensation may also be used.

It is preferable that silicon compound (A) takes a form expressed using the general formula (a) below.

$$Si(R^1)_m(R^2)_n(R^3)_{4-m-n} \quad (a)$$

(R1 represents a reactive group containing an ethylenically unsaturated group. $R^2$ represents any one of an alkoxy group, alkenyloxy group, carboxy group, ketoxime group, halogen atom and an isocyanate group. $R^3$ represents H or an alkyl group. The letters m and n represent integers that satisfy $m+n\leq4$, $m\geq1$, $n\geq1$. If each of $R^1$, $R^2$ and $R^3$ contains two or more functional groups that are bonded to a silicon atom, they may be identical or different.)

As described above, $R^1$ is a reactive group containing an ethylenically unsaturated group.

$R^2$ is a hydrolysable group, as described above. It is preferable that any alkyl group functioning as $R^3$ have a carbon number of 1 to 10, more preferably 1 to 2.

In relation to the formation of a separation functional layer, an alkoxy group is preferably used as a hydrolysable group because it makes a viscous reaction solution.

Examples of such a silicon compound include vinyl trimethoxysilane, vinyl triethoxysilane, styryl trimethoxysilane, methacryloyloxy propyl methyl dimethoxy silane, methacryloyloxy propyl trimethoxysilane, methacryloyloxy propyl methyl diethoxy silane, methacryloyloxy propyl triethoxysilane, and acryloxy propyl trimethoxysilane.

In addition to compound (A), silicon compound (C), which contains a hydrolysable group but not a reactive group containing an ethylenically unsaturated group, may also be used. This means that, while $m\geq1$ applies when defining compound (A) using general formula (a), $m=0$ applies when defining compound (C) using the same general formula. Examples of compound (C) include tetramethoxysilane, tetraethoxysilane, methyl trimethoxysilane, and methyl triethoxysilane.

Next, compound (B), a compound other than compound (A) that contains an ethylenically unsaturated group, is described.

An ethylenically unsaturated group has addition-polymerizability. Examples of such a compound include ethylene, propylene, meta-acrylic acid, acrylic acid, styrene, and derivatives thereof.

It is preferable that such a compound be an alkali-soluble compound containing an acid group from the viewpoint of enhancing the selective permeability of water and increasing the salt rejection rate when a separation membrane is used for the separation of aqueous solution or the like.

Preferable acid structures are carboxylic acid, phosphonate acid, phosphoric acid and sulfonic acid, and these structures may exist in any of the acid, ester compound and metal salt forms. While a compound containing one or more ethylenically unsaturated groups is capable of containing two or more acids, a compound containing one or two acid groups is particularly preferable.

Examples of a compound containing one or more ethylenically unsaturated groups as described above that also contains a carboxylic acid group include maleic acid, maleic anhydride, acrylic acid, methacrylic acid, 2-(hydroxymethyl) acrylic acid, 4-(meth)acryloyloxyethyl trimellitic acid & corresponding anhydride, 10-methacryloyloxy decyl malonic acid, N-(2-hydroxy-3-methacryloyloxy propyl)-N-phenyl glycine, and 4-vinyl benzoic acid.

Examples of a compound containing one or more ethylenically unsaturated groups as described above that also contains a phosphonate acid group include vinyl phosphonate acid, 4-vinyl phenylphosphonic acid, 4-vinyl benzyl phosphonate acid, 2-methacryloyloxy ethyl phosphonate acid, 2-methacrylamide ethyl phosphonate acid, 4-methacrylamide-4-methyl-phenyl-phosphonate acid, 2-[4-(dihydroxyphosphoryl)-2-oxa-butyl]-acrylic acid, and 2-[2-dihydroxyphosphoryl)-ethoxy methyl]-acrylic acid-2,4,6-trimethyl-phenyl ester.

Examples of a compound containing one or more ethylenically unsaturated groups as described above that is a phosphate ester compound include 2-methacryloyloxy propyl monohydrogen phosphoric acid and 2-methacryloyloxy propyl dihydrogen phosphoric acid; 2-methacryloyloxy ethyl monohydrogen phosphoric acid and 2-methacryloyloxy ethyl dihydrogen phosphoric acid; 2-methacryloyloxy ethyl-phenyl monohydrogen phosphoric acid; dipenta erythritol-pentamethacryloyloxy phosphate; 10-methacryloyloxy decyl-dihydrogen phosphoric acid; dipenta erythritol pentamethacryloyloxy phosphate; phosphoric acid mono-(1-acryloyl-piperidine-4-yl)-ester; 6-(methacrylamide) hexyl dihydrogen phosphate; and 1,3-bis-(N-acryloyl-N-propyl-amino)-propane-2-yl-dihydrogen phosphate.

Examples of a compound containing one or more ethylenically unsaturated groups as described that also contains a sulfonic acid group include vinyl sulfonic acid, 4-vinyl phenyl sulfonic acid, and 3-(methacrylamide) propyl sulfonic acid.

In the formation of a separation functional layer with an organic-inorganic hybrid structure, a reaction solution containing compound (A), compound (B) and a polymerization initiator is used. After this reaction solution is applied over the porous layer as a coat, its constituent compounds are turned into high-molecular weight compounds by condensing hydrolysable groups and polymerizing ethylenically unsaturated groups.

When compound (A) is condensed alone, the concentration of cross-linked chain bonds occurs at silicon atoms, and this produces a large density difference between the vicinity of the silicon atoms and regions distant from the silicon atoms. Consequently, the pore size in the separation functional layer tends to be uneven. On the other hand, in addition to the increase in molecular weight and cross-linking of compound (A) itself, copolymerization with compound (B) moderately disperses the cross-linking points resulting from condensation of hydrolyzable groups and the cross-linking points resulting from polymerization of ethylenically unsaturated groups. Such a moderate dispersion of cross-linking points evens out pore sizes in the separation membrane. This results in the achievement of a good balance between the water permeation performance and rejection performance in the separation membrane. In this regard, compounds having one or more ethylenically unsaturated groups, if their molecular weight is low, sometimes cause degradation in membrane performance by leaching out during the use of the separation membrane. However, under the present invention, compounds are polymerized in the separation functional layer, and this makes it possible to limit such degradation in membrane performance.

In such a manufacturing method, it is preferable that the content of compound (A) be 10 parts by weight or more, more preferably 20 to 50 parts by weight, for 100 parts by weight of solids contained in the reaction solution. Here, the solids contained in the reaction solution refer to all components of the reaction solution other than those distilled away, including solvents and water & alcohol produced during the condensation reaction, namely those that eventually end up forming part of the separation functional layer of the obtained separation membrane only. The presence of compound (A) in a sufficient amount reduces the risk of problems such as degradation in separation performance due to the leaching of the separation functional layer during membrane filtration arising by ensuring a sufficient degree of cross-linking.

It is preferable that the content of compound (B) be 90 parts by weight or less, more preferably 50 to 80 parts by weight, for 100 parts by weight of solids contained in the reaction solution. If the content of compound (B) is in this range, the separation functional layer does not leach as it enjoys a high degree of cross-linking, and this makes stable membrane filtration possible.

Next, a method to form a separation functional layer having an organic-inorganic hybrid structure as described above over a porous layer is described.

The method to form a separation functional layer described here as an example comprises a step to apply a reaction solution containing compound (A) and compound (B), a step to remove the solvent, a step to polymerize ethylenically unsaturated groups and a step to condense hydrolyzable groups in that order. In the step to polymerize ethylenically unsaturated groups, the condensation of hydrolyzable groups may simultaneously take place.

First, the reaction solution containing compound (A) and compound (B) is brought into contact with the porous layer. This reaction solution is a solution containing ordinary solvent, and the solvent is not subject to any specific restrictions as long as it is not destructive of the porous layer and dissolves compound (A), compound (B) and, if necessary, a polymerization initiator. Adding water to this reaction solution by an amount 1 to 10 times, preferably 1 to 5 times, the number of moles of compound (A) together with an inorganic acid or an organic acid can promote hydrolysis of compound (A).

It is preferable that the solvent of the reaction solution be water, an alcoholic organic solvent, ether-based organic solvent, ketone-based organic solvent, and a mixture thereof. Examples of an alcoholic organic solvent include methanol, ethoxy methanol, ethanol, propanol, butanol, amyl alcohol, cyclohexanol, methyl cyclohexanol, ethylene glycol monomethyl ether (2-methoxy ethanol), ethylene glycol monoacetoester, diethylene glycol monomethyl ether, diethylene glycol monoacetate, propylene glycol monoethyl ether, propylene glycol monoacetate, dipropylene glycol monoethyl ether, and methoxy butanol. Examples of an ether-based organic solvent include methylal, diethyl ether, dipropyl ether, dibutyl ether, diamyl ether, diethyl acetal, dihexyl ether, and trioxane, dioxane. Examples of a ketone-based organic solvent include acetone, methyl ethyl ketone, methyl propyl ketone, methyl isobutyl ketone, methyl amyl ketone, methyl cyclohexyl ketone, diethyl ketone, ethyl butyl ketone, trimethyl nonanone, acetonitrile acetone, dimethyl oxide, phorone, cyclohexanone, and diacetone alcohol.

The amount of solvent blended may be 50 to 99 parts by weight, or 80 to 99 parts by weight, for 100 parts by weight of solids contained in the reaction solution. If the amount of solvent blended is too large, flaws tend to be generated in the membrane, and, if the amount of solvent blended is too small, the water permeability of the separation membrane obtained tends to be low.

It is preferable that the contact between the porous layer and the above reaction solution takes place uniformly and continuously over the porous layer. In concrete terms, there is, for example, a method to coat the porous layer with the reaction solution using a coating applicator, such as a spin coater, wire bar, flow coater, die coater, roll coater, or sprayer. Another example is a method to immerse the porous layer in the reaction solution.

With the immersion method, the contact time between the porous layer and the reaction solution is preferably in the 0.5 to 10 minute range, more preferably in the 1 to 3 minute range. It is preferable that, after the reaction solution has been brought into contact with the porous layer, the solution be drained sufficiently so as to avoid droplets of the solution remaining on the porous layer. Sufficient drainage makes it possible to prevent degradation of membrane performance due to membrane flaws created in regions where droplets remain after the formation of the membrane. Available solution draining methods include natural draining by vertically holding the porous layer after contact with the reaction solution to let the excess solution flow down by gravity and forced drainage by blowing nitrogen, etc. from an air nozzle (e.g., an air knife). After draining, the membrane surface may be dried to remove some of the solvent component of the reaction solution.

The step to condense silicon hydrolyzable groups is carried out by providing a heat treatment after bringing the reaction solution into contact with the porous layer. The heating temperature in this step is required to be lower than the temperature at which the porous layer starts to melt and causes degradation in the performance of the separation membrane. To ensure that the condensation reaction proceeds rapidly, it is preferable that the heating, under normal circumstances, take place at 0° C. or more, more preferably at 20° C. or more. It is also preferable that the temperature of the above reaction be 150° C. or less, more preferably 100° C. or less. If the reaction temperature is 0° C. or more, the hydrolysis and condensation reaction proceeds rapidly, while, if it is 150° C. or less, the hydrolysis and condensation reaction can be more easily controlled. Furthermore, adding a catalyst that promotes hydrolysis or condensation makes it possible to have the reaction proceed even at lower temperatures. In this regard, selecting heating conditions and humidity conditions in such a way that the separation functional layer has fine pores makes it possible to optimize the condensation reaction.

Polymerization methods for ethylenically unsaturated groups contained in compound (A) and compound (B), i.e. compounds having an ethylenically unsaturated group, include heat treatment, electromagnetic wave irradiation, electron beam irradiation and plasma irradiation. Here, electromagnetic waves include infrared light, ultraviolet light, X-rays, gamma-rays, and the like. Although a polymerization method may be chosen optimally on a case by case basis, electromagnetic wave irradiation is generally preferred from the viewpoint of, for instance, running costs and productivity. Of all electromagnetic waves, infrared light and ultraviolet light are more preferred in terms of convenience. When polymerization is carried out using infrared light or ultraviolet light, the light source only has to emit such light as part of a wider wavelength spectrum, rather than exclusively emitting electromagnetic waves belonging to that particular spectrum. Nevertheless, it is preferable that, from the viewpoint of, for instance, shortening of polymerization time and control of polymerization conditions, the intensity of those electromagnetic waves be higher than that of electromagnetic waves belonging to other wavelength spectra.

Electromagnetic waves can be generated by halogen lamp, xenon lamp, UV lamp, excimer lamp, metal halide lamp, rare gas fluorescent lamp, mercury lamp, or the like. Although there are no specific restrictions on the energy of the electromagnetic waves as long as polymerization can occur, high-efficiency and high-frequency ultraviolet light is particularly efficient in forming thin membranes. Such ultraviolet light can be generated by low-pressure mercury lamp or excimer laser lamp. The thickness and configuration of a separation functional layer can vary significantly depending on the polymerization conditions, and, in the case of polymerization by electromagnetic waves, can vary considerably according to the wavelengths and intensity of the electromagnetic waves, the distance to the object to be irradiated, and processing time. Accordingly, these conditions need to be optimized as appropriate.

To increase the rate of polymerization, it is preferable to add a polymerization initiator, polymerization accelerator, and the like when forming a separation functional layer. There are no specific restrictions on the polymerization initiator and polymerization accelerator, and they should be suitably selected according to, for instance, the structure of the monomer used, the polymerization method, and so on.

Examples of a polymerization initiator are given below. Examples of an initiator for polymerization by electromagnetic waves include benzoin ether, dialkyl benzyl ketal, dialkoxyacetophenone, acylphosphine oxide or bisacylphosphine oxide, α-diketone (e.g., 9,10-phenanthrenequinone), diacetylquinone, furylquinone, anisylquinone, 4,4'-dichlorobenzylquinone & 4,4'-dialkoxybenzylquinone, and camphorquinone. Examples of an initiator for polymerization by heat include an azo compound (e.g., 2,2'-azobis(isobutyronitrile) (AIBN), or azobis-(4-cyanovalerianic acid)) and peroxide (e.g., dibenzoyl peroxide, dilauroyl peroxide, tert-butyl peroctoate, tert-butyl perbenzoate, or di-(tert-butyl) peroxide), as well as an aromatic diazonium salt, bissulfonium salt, aromatic iodonium salt, aromatic sulfonium salt, potassium persulfate, ammonium persulfate, alkyl lithium, cumyl potassium, sodium naphthalene, and distyryl dianion. Of these, benzopinacol and 2,2'-dialkylbenzopinacol are particularly preferred as an initiator for radical polymerization.

Peroxides and α-diketones are used to accelerate the initiation, preferably in combination with an aromatic amine. Such a combination is known as a redox system. A typical redox system combines benzoyl peroxide or camphorquinone with an amine (e.g., N,N-dimethyl-p-toluidine, N,N-dihydroxyethyl-p-toluidine, p-dimethyl-ethyl aminobenzoate ester, or a derivative thereof). In addition, a system that contains a peroxide in combination with ascorbic acid, barbiturate or sulfinic acid as a reducing agent is also preferable A polycondensation reaction then occurs as a heat treatment is provided at about 100 to 200° C., and a separation functional layer, derived from a silane coupling agent, is formed over the porous layer surface. Though depending on the ingredients of the porous layer, if the heating temperature is too high, the material dissolves and blocks pores in the porous layer, leading to a reduction in the water producing capacity of the separation membrane produced eventually. If, on the other hand, it is too low, an insufficient polycondensation reaction causes the separation functional layer to leach and reduces the rejection rate.

In the manufacturing method described above, the step to increase the molecular weight of the silane coupling agent and the compound having one or more ethylenically unsaturated groups may be carried out before or after the step to polycondense the silane coupling agent. Alternatively, the steps may take place simultaneously.

Although the obtained separation membrane with an organic-inorganic hybrid structure may be put to use as it is, it is preferable that its surface be hydrophilized before use with, for instance, an alcohol-containing aqueous solution or an aqueous alkaline solution.

<Posttreatment>

With any of the separation membranes specified in (i) to (iii) above, a chemical treatment based on a chlorine-containing compound, acid, alkali, nitrous acid, a coupling agent, or the like may be provided to improve its basic performance, including permeation performance and rejection performance. Furthermore, washing may be performed to remove any monomers that have failed to polymerize.

2. Manufacture of Separation Membrane Element

The separation membrane described above may be used as a component of a separation membrane element.

In a separation membrane element, source fluid is fed to one surface of a separation membrane, while permeate fluid is obtained from the other surface. The separation membrane element is configured in such a way that a large number of separation membranes are bundled together to increase the membrane area and thereby generate a large permeate fluid flow per element. According to the intended use and purpose, various shapes, such as spiral-type, hollow-fiber-type, plate-and-frame-type, rotating flat membrane-type, integrated flat membrane-type, may be adopted for membrane elements.

Figure 4:
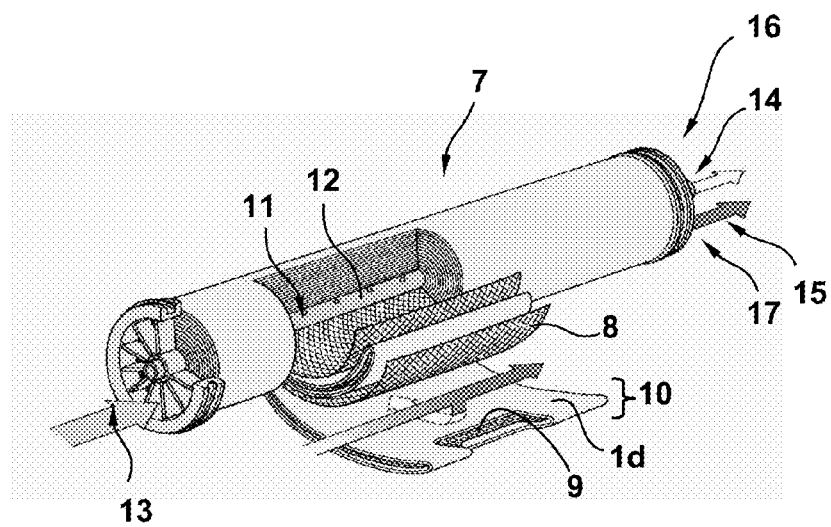
FIG. 4 Is a partially cut-out perspective view of an example of a separation membrane element.

In reverse osmosis filtration, for instance, spiral-type separation membrane elements are widely used as they allow a large permeate fluid flow to be drawn by applying pressure to the source fluid. A spiral-type separation membrane element comprises a feedwater channeling medium that feeds source fluid to a the supply-side surface of the separation membrane, a separation membrane that separates components contained in the source fluid, and a permeate channeling medium that guides the permeate fluid, which has permeated through the separation membrane and been separated from the source fluid, to the perforated water collecting pipe. These parts are wound around the perforated water collecting pipe. FIG. 4 is a partially cut-out perspective view that schematically illustrates a spiral-type separation membrane element.

In a spiral-type separation membrane element 7 as illustrated in FIG. 4, a polymer net 8 is used to provide a supply-side flow path as the feedwater channeling medium. As the permeate channeling medium, a fabric called a tricot 9, having a finer mesh than that of the feedwater channeling medium, is used to prevent sagging of the membrane 1d and provide a permeate-side flow path. An envelope-style folded membrane 10 is formed by the membrane 1d, which has been folded over the permeate channeling medium from both sides like an envelope, with the inside space of the envelope-style folded membrane 10 constituting the flow path for permeate fluid. Now, a number of such envelope-style folded membranes 10 and nets 8 are laid upon each other to form alternate layers and wound together spirally, with certain parts of the open ends of the envelope-style folded membranes 10 bonded to the circumference surface of the perforated water collecting pipe 12.

Fluid separation using the spiral-type separation membrane element 7 is now described. With the separation membrane element 7 placed inside a pressure vessel (not shown), source fluid 13 is fed to it from one end.

As illustrated in FIG. 4, the supplied source fluid 13 is separated into permeate fluid 14, which permeates through the separation membrane 1d, and concentrate fluid 15, which contains substances that are blocked by it. The permeate fluid 14 then passes through the holes 11 and reaches the inside of the perforated water collecting pipe 12. Carried by the perforated water collecting pipe 12, the permeate fluid 14 goes on to be discharged outside the separation membrane element 7 via the permeate fluid outlet 16. The concentrate fluid 15, on the other hand, travels inside the separation membrane element 7 by flowing through the spaces between separation membranes, eventually discharged outside the separation membrane element 7 via the concentrate fluid outlet 17.

III. Use of Separation Membrane and Separation Membrane Element

It is also possible to provide a separation membrane module based on the separation membrane element described above by connecting a number of elements in series or parallel and housing them in a pressure vessel.

It is also possible to configure a fluid separation apparatus from the separation membrane, separation membrane element and separation membrane module described above by combining them with a pump to feed raw water thereto, a device to pretreat the raw water, and the like. Using this apparatus makes it possible to separate raw water into permeate water, such as drinking water, and concentrate water, which was rejected by the membrane, and obtain the kind of water that suits the intended purpose.

The higher the operating pressure of the fluid separation apparatus, the greater the salt rejection rate, but the amount of energy required for operation increases at the same time. Taking this and the durability of the separation membrane into consideration, it is preferable that the operating pressure applied when passing raw water through a separation membrane be 0.1 MPa to 10 MPa. The temperature of feedwater is preferably 5° C. to 45° C. since the desalination rate decreases as the temperature of feedwater increases, while the membrane permeate flux decreases as it decreases. A high-pH source fluid, if accompanied by a high salt concentration as with the case of seawater, gives rise to the scaling of magnesium and the like, while high-pH operation raises concern about membrane degradation. For these reasons, operation in the neutral range is preferred.

There are no specific restrictions on the type of fluid to be treated with the separation membrane, but, when used in water treatment, the source fluid takes the form of seawater, brackish water, wastewater, and a similar liquid mixture. In concrete terms, such a liquid mixture contains 0.05 wt % or more and 10 wt % or less of total dissolved solids (TDS). According to the official definition, TDS can be calculated from the weight of the residue obtained from a solution that has been passed through a 0.45-micron filter by vaporizing it at a temperature of 39.5 to 40.5° C. More conveniently, however, TDS is determined by conversion from practical salinity (S).

Working Examples

The present invention is described in more detail below using working examples, though the present invention is not, in any way, limited to those examples.

<Measurement Methods>

(1) Water Producing Capacity of Separation Membrane with Separation Functional Layer The water producing capacity of a separation membrane featuring a substrate, porous layer and separation functional layer was measured as described below.

A separation membrane was fed seawater with a TDS concentration of 3.5 wt %, adjusted to a temperature of 25° C. and a pH of 6.5, as source fluid (i.e., feedwater) at an operating pressure of 5.5 MPa. The flow rate of permeate water obtained through the separation of the feedwater into permeate water and concentrate water was measured as the water producing capacity of the separation membrane ($m^3/m^2$/day) as expressed in terms of the daily amount of permeate water produced ($m^3$/day) per unit area of the membrane surface ($m^2$).

(2) Desalination Rate of Separation Membrane with Separation Functional Layer

The desalination rate of a separation membrane featuring a substrate, porous layer and separation functional layer was measured as described below.

A separation membrane was fed seawater with a TDS concentration of 3.5 wt %, adjusted to a temperature of 25° C. and a pH of 6.5, as source fluid (i.e., feedwater) at an operating pressure of 5.5 MPa. The electrical conductivities of the source fluid and permeate water were measured, and the desalination rate was calculated using the formula below.

Desalination rate(TDS removal rate) (%)=(1−TDS concentration of permeate water/TDS concentration of feedwater)×100

(3) Permeability of Fiber-Reinforced Porous Film (Pure Water Permeation Coefficient)

The permeability of a separation membrane featuring a substrate and porous layer but not featuring a separation functional layer was measured as described below. Hereinafter, such a separation membrane is referred to as a "fiber-reinforced porous film" to differentiate it from a separation membrane featuring a separation functional layer.

A circular piece with a diameter of 50 mm was cut out of a fiber-reinforced porous film. The cut-out fiber-reinforced porous film was set in a cylindrical filter holder. After passing 25° C. distilled water through the piece for 5 minutes at a water head of 1 m (9.8 kPa) for preparatory purposes, the permeate water was collected for 3 minutes as the distilled water continued to be passed through it under the same conditions. The amount of the obtained permeate water was converted to the flow rate per unit area of the effective film surface, and this was adjusted for pressure to calculate water permeation performance (m³/m²/s/Pa) as a measure of permeability.

(4) Solute Rejection Rate of Fiber-Reinforced Porous Film (Polystyrene Fine Particle Rejection Rate)

The solute rejection rate of a fiber-reinforced porous film was measured as described below, focusing on the rejection rate for polystyrene fine particles.

A stock solution for evaluation was prepared by dispersing polystyrene fine particles (manufactured by Magshere, Ltd., average particle diameter 0.083 μm, nominal particle diameter 0.032 μm) in distilled water to a concentration of 20 ppm.

A 4.3 cm-diam. circular cut-out piece of fiber-reinforced porous film was set in a stirred cell (manufactured by Advantec, VHP-43K), and 10 ml of the 50 ml stock solution for evaluation was filtered through it at an evaluation pressure of 100 kPa and a stirring speed of 700 rpm. The 3 ml of permeate obtained was recovered along with the rest of the stock solution for evaluation, which still remained in the stirred cell. The fine particle rejection rate was calculated from the ultraviolet light absorbance of the stock solution for evaluation and permeate (wavelength: 250 nm) using the formula below.

Fine particle rejection rate (%)=(1−Absorbance of permeate water/Absorbance of feedwater)×100

Here, absorbance measurement was carried out using a spectrophotometer (U-3200) (manufactured by Hitachi, Ltd.).

Preparation of Separation Membrane

Working Example 1 a. Preparation of Fiber-Reinforced Porous Film

As the resin constituting a porous layer, PSf (manufactured by Solvay Advanced Polymers K.K., Udel (registered trademark) P3500) was used. As the solvent of the polymer solution, DMIB was used. These were thoroughly stirred at 95° C., and a polymer solution comprising 15.0 wt % of PSf and 85.0 wt % of DMIB (stock solution for membrane production) was prepared.

Next, after being cooled to 25° C., the above polymer solution was cast over a nonwoven fabric made of polyester long fibers (yarn diameter: 1 decitex, thickness: approx. 90 μm, air permeability: 1 cc/cm²/sec, fiber orientation angle in the surface layer next to porous layer: 40°, and fiber orientation angle in the surface layer opposite to porous layer: 20°) at room temperature (25° C.) to a thickness of 180 μm. Immediately after casting, it was immersed in pure water and left to stand in pure water for 20 seconds, followed by washing with 75° C. hot water for 2 minutes, to prepare a fiber-reinforced porous film (thickness 140 μm) comprising a substrate and porous layer.

The obtained fiber-reinforced porous film was subjected to the measurement of performance as described above. Measurement results are shown in Table 1.

b. Preparation of Separation Membrane with Separation Functional Layer

After being immersed in a 6.5 wt % aqueous solution of m-phenylene diamine for 10 seconds, the fiber-reinforced porous film obtained in the procedure described in a. above was slowly lifted in the vertical direction to let as much of the excess aqueous solution drip down as possible. Nitrogen was then blown from an air nozzle to remove any remaining superfluous aqueous solution from the film surface. Next, an n-decane solution, containing 0.175 wt % of TMC and 0.015 wt % of terephthalic acid chloride (TPC) (TMC/TPC molar ratio=90/10), was applied to the film as a coat in such a way that it completely wet the film surface. After leaving it to stand for 10 seconds, air was blown to remove any superfluous aqueous solution from the film, followed by washing with 90° C. hot water for 2 minutes.

The obtained separation membrane with a separation functional layer was subjected to the measurement of performance as described above.

Measurement results are shown in Table 1, along with those for other working examples and comparative examples.

Working Example 2

A fiber-reinforced porous film was prepared in the same manner as working example 1, except that the polymer solution casting temperature during the formation of a porous layer was changed to 40° C.

A separation membrane was then prepared by forming a separation functional layer over this fiber-reinforced porous film in the same manner as working example 1.

The performances of such a film and membrane are shown in Table 1.

Working Example 3

A fiber-reinforced porous film was prepared in the same manner as working example 1, except that, in the polymer solution used for the formation of a porous layer, polyethersulfone (PES: manufactured by BASF, Ultrason (registered trademark) E6020) was added to PSf as a resin. As shown in Table 1, the concentrations of Psf and PES in the polymer solution were 5.0 wt % and 10.0 wt %, respectively.

A separation membrane was then prepared by forming a separation functional layer over this fiber-reinforced porous film in the same manner as working example 1.

The performances of such a film and membrane are shown in Table 1.

Working Examples 4 to 6

In working examples 4 to 6, a fiber-reinforced porous film was prepared in the same manner as working example 1, except that the solvent of the polymer solution used for the formation of a porous layer was changed to a mixed solvent of DMIB and DMF. A separation membrane was then prepared by forming a separation functional layer over the obtained fiber-reinforced porous film in the same manner as working example 1.

The concentrations of component solvents in the polymer solution, the performance of the obtained fiber-reinforced porous film and the performance of the separation membrane with a separation functional layer in working examples 4 to 6 are shown in Table 1.

Working Example 7

In working example 7, a fiber-reinforced porous film was prepared in the same manner as working example 1, except that the solvent of the polymer solution used for the formation of a porous layer was changed to a mixed solvent of DMIB and NMP. The concentrations of component solvents in the polymer solution are shown in Table 1.

A separation membrane was then prepared by forming a separation functional layer over this fiber-reinforced porous film in the same manner as working example 1.

The performances of such a film and membrane are shown in Table 1.

Working Example 8

In working example 8, a fiber-reinforced porous film was prepared in the same manner as working example 1, except that the solvent of the polymer solution used for the formation of a porous layer was changed to a mixed solvent of DMIB and DMSO. The concentrations of component solvents in the polymer solution are shown in Table 1.

A separation membrane was then prepared by forming a separation functional layer over this fiber-reinforced porous film in the same manner as working example 1.

The performances of such a film and membrane are shown in Table 1.

Working Example 9

In working example 9, a fiber-reinforced porous film was prepared in the same manner as working example 1, except that the solvent of the polymer solution used for the formation of a porous layer was changed to a mixed solvent of DMIB and DMAc. The concentrations of component solvents in the polymer solution are shown in Table 1.

A separation membrane was then prepared by forming a separation functional layer over this fiber-reinforced porous film in the same manner as working example 1.

The performances of such a film and membrane are shown in Table 1.

Working Example 10

In working example 10, a fiber-reinforced porous film was prepared in the same manner as working example 1, except that the solvent of the polymer solution used for the formation of a porous layer was changed to a mixed solvent of DMIB and NIB. The concentrations of component solvents in the polymer solution are shown in Table 1.

A separation membrane was then prepared by forming a separation functional layer over this fiber-reinforced porous film in the same manner as working example 1.

The performances of such a film and membrane are shown in Table 1.

Working Example 11

In working example 11, a fiber-reinforced porous film was prepared in the same manner as working example 1, except that the solvent of the polymer solution used in the formation of a porous layer was changed to NIB.

A separation membrane was then prepared by forming a separation functional layer over this fiber-reinforced porous film in the same manner as working example 1.

The performances of such a film and membrane are shown in Table 1.

Working Example 12

In working example 12, a fiber-reinforced porous film was prepared in the same manner as working example 1, except that the solvent of the polymer solution used for the formation of a porous layer was changed to a mixed solvent of NIB and DMF. The concentrations of component solvents in the polymer solution are shown in Table 1.

A separation membrane was then prepared by forming a separation functional layer over this fiber-reinforced porous film in the same manner as working example 1.

The performances of such a film and membrane are shown in Table 1.

Working Examples 13 and 14

In working examples 13 and 14, a fiber-reinforced porous film was prepared in the same manner as working example 1, except that the substrate was changed. In working example 13, a nonwoven fabric derived from a long-fiber nonwoven fabric using the paper machine method was used as the substrate.

In working example 14, a long-fiber nonwoven fabric whose fiber orientation angle in the surface layer next to the porous layer was 20° and whose fiber orientation angle in the surface layer opposite to the porous layer was 40° was used.

A separation membrane was then prepared by forming a separation functional layer over this fiber-reinforced porous film in the same manner as working example 1.

The performances of such a film and membrane are shown in Table 1.

Working Example 15

A separation membrane was prepared in the same manner as working example 1, except that the conditions for the formation of a separation functional layer were changed as described below.

The concentration of m-phenylene diamine in the polyfunctional amine aqueous solution was changed from 6.5 wt % to 3.5 wt %.

The TMC concentration of the n-decane solution was changed to 0.120 wt %, while its TPC concentration was changed to 0.010 wt %. The molar ratio between TMC and TPC was TMC/TPC=90/10, which was the same as working example 1.

The temperature at which the separation membrane was washed after the formation of a separation functional layer was changed to 40° C.

The performance of the separation membrane is shown in Table 1. In working example 15, a fiber-reinforced porous film obtained under the same conditions as working example 1 was used, so that the inclusion of the performance of the fiber-reinforced porous film in the table was omitted.

Working Example 16

The conditions for the formation of a porous layer were changed as described below.

As the resin constituting a porous layer, polyvinylidene fluoride (PVDF: manufactured by Kureha Chemical Industry Co., Ltd., KF polymer #1100) was used. As the solvent of the polymer solution, a mixed solvent of DMIB and DMF was used. In addition, polyethylene glycol (PEG) with a molecular weight of 10,000 and water were used as a pore opening agent and non-solvent, respectively. These were thoroughly stirred at 95° C., and a polymer solution comprising 18.0 wt % of PVDF, 25.0 wt % of DMIB, 50.0 wt % of DMF, 5.0 wt % of PEG and 2.0 wt % of water was prepared.

Next, after being cooled to 25° C., the above polymer solution was cast over a nonwoven fabric made of polyester long fibers (yarn diameter: 3 decitex, thickness: approx. 160 µm, air permeability: 4.3 cc/cm$^2$/sec, and density 0.4 g/cm$^3$) at room temperature (25° C.) to a thickness of 300 µm. Immediately after casting, it was immersed in pure water and left to stand in pure water for 20 seconds, followed by washing with 90° C. hot water for 2 minutes, to prepare a fiber-reinforced porous film (thickness 280 µm) comprising a substrate and porous layer.

The obtained fiber-reinforced porous film was subjected to the measurement of performance as described above. Measurement results are shown in Table 1.

Working Example 17

In working example 17, a separation membrane was prepared in the same manner as working example 16, except that the concentrations of DMIB and DMF in the solvent of the polymer solution used for the formation of a porous layer were changed.

The performance of the fiber-reinforced porous film obtained in this manner is shown in Table 1.

Working Example 18

As the resin constituting a porous layer, PVDF (manufactured by Kureha Chemical Industry Co., Ltd., KF polymer #1100) was used. As the solvent, a mixed solvent of DMIB and DMF was used. These were thoroughly stirred at 95° C., and a polymer solution comprising 20.0 wt % of PVDF, 20.0 wt % of DMIB and 60.0 wt % of DMF was prepared.

Next, the above polymer solution was discharged from an orifice, heated to 60° C., with the accompaniment of a mixed solvent of DMF/water=80/20 (wt %) as the hollowed part-shaping liquid to form a tube with an outside diameter of 1.5 mm and an inside diameter of 0.8 mm. After being passed through a dry part approx. 5 cm in size, the discharged solution was immersed in a 30° C. coagulating bath with a DMF/water=20/80 (wt %) to form a separation membrane. The obtained separation membrane was washed with 90° C. hot water for 1.5 minutes to prepare a hollow fiber separation membrane with an outside diameter of 1.4 mm and an inside diameter of 0.8 mm.

The performance of the obtained separation membrane is shown in Table 1.

Comparative Examples 1 to 4

In comparative examples 1 to 4, a fiber-reinforced porous film was prepared in the same manner as working example 1, except that the solvent of the polymer solution used for the formation of a porous layer was changed to DMF, NMP, DMSO and DMAc, respectively. A separation membrane was then prepared by forming a separation functional layer over the obtained fiber-reinforced porous film in the same manner as working example 1.

The performances of the fiber-reinforced porous film and the separation membrane with a separation functional layer obtained in comparative examples 1 to 4 are as shown in Table 1, except for the separation membrane with a separation functional layer for comparative example 3, which could not be formed due to the occurrence of peeling of the separation functional layer from the porous layer.

Comparative Example 5

A fiber-reinforced porous film was prepared in the same manner as working example 1, except that the resin and solvent of the polymer solution used for the formation of a porous layer were changed to 5.0 wt % of PSf & 10.0 wt % of PES and 85.0 wt % of DMF, respectively.

A separation membrane was then prepared by forming a separation functional layer over this fiber-reinforced porous film in the same manner as working example 1.

The performances of such a film and membrane are shown in Table 1.

Comparative Example 6

A fiber-reinforced porous film and a separation membrane with a separation functional layer were prepared in the same manner as comparative example 1, except that the conditions for the formation of the separation functional layer were changed as described below.

The concentration of m-phenylene diamine in the polyfunctional amine aqueous solution was changed from 6.5 wt % to 3.5 wt %.

The TMC concentration of the n-decane solution and its TPC concentration were changed to 0.120 wt % and 0.010 wt %, respectively. The molar ratio between TMC and TPC was TMC/TPC=90/10, which was the same as comparative example 1.

The temperature at which the separation membrane was washed after the formation of a separation functional layer was changed to 40° C.

The performance of the separation membrane is shown in Table 1. In this comparative example, a fiber-reinforced porous film obtained under the same conditions as comparative example 1 was used, so that the inclusion of the performance of the fiber-reinforced porous film in the table was omitted.

Comparative Example 7

In comparative example 7, a fiber-reinforced porous film was prepared in the same manner as working example 16, except that the solvent of the polymer solution used for the formation of a porous layer was changed to DMF.

A separation membrane was then prepared by forming a separation functional layer over this fiber-reinforced porous film in the same manner as working example 1.

The performances of such a film and membrane are shown in Table 1.

Comparative Example 8

A fiber-reinforced porous film was prepared in the same manner as working example 18, except that the solvent of the polymer solution used for the formation of a porous layer was changed to DMF.

The performance of the fiber-reinforced porous film is shown in Table 1.

TABLE 1

| | Performance of fiber-reinforced porous film | | Separation membrane with separation functional layer | | Porous layer | | | | |
|---|---|---|---|---|---|---|---|---|---|
| | Pure water permeation coefficient ($m^3/m^2/s/Pa$) | PSt fine particle rejection rate (%) | Water producing capacity ($m^3/m^2/Day$) | Desalination rate (%) | Solvent Type | Weight % | Resin Type | Weight % | Remarks |
| Working example 1 | $4.6 \times 10^{-9}$ | 99.8 | 0.77 | 99.7 | DMIB | 85.0 | PSf | 15.0 | — |
| Working example 2 | $4.8 \times 10^{-9}$ | 99.7 | 0.80 | 99.6 | DMIB | 85.0 | PSf | 15.0 | Casting temperature changed to 40° C. |
| Working example 3 | $3.9 \times 10^{-9}$ | 99.2 | 0.62 | 84.6 | DMIB | 85.0 | PSf/PES | 5.0/10.0 | — |
| Working example 4 | $4.4 \times 10^{-9}$ | 99.7 | 0.75 | 99.6 | DMIB/DMF | 70.0/15.0 | PSf | 15.0 | — |
| Working example 5 | $4.0 \times 10^{-9}$ | 99.6 | 0.70 | 99.6 | DMIB/DMF | 42.5/42.5 | PSf | 15.0 | — |
| Working example 6 | $2.7 \times 10^{-9}$ | 99.7 | 0.73 | 99.7 | DMIB/DMF | 15.0/70.0 | PSf | 15.0 | — |
| Working example 7 | $3.3 \times 10^{-9}$ | 99.7 | 0.73 | 99.7 | DMIB/NMP | 42.5/42.5 | PSf | 15.0 | — |
| Working example 8 | $19.8 \times 10^{-9}$ | 98.8 | 0.71 | 90.8 | DMIB/DMSO | 42.5/42.5 | PSf | 15.0 | — |
| Working example 9 | $4.2 \times 10^{-9}$ | 99.5 | 0.40 | 96.5 | DMIB/DMAc | 42.5/42.5 | PSf | 15.0 | — |
| Working example 10 | $3.8 \times 10^{-9}$ | 99.5 | 0.75 | 99.6 | DMIB/NIB | 70.0/15.0 | PSf | 15.0 | — |
| Working example 11 | $3.7 \times 10^{-9}$ | 99.5 | 0.74 | 99.6 | NIB | 85.0 | PSf | 15.0 | — |
| Working example 12 | $3.4 \times 10^{-9}$ | 99.6 | 0.72 | 99.5 | NIB/DMF | 70.0/15.0 | PSf | 15.0 | — |
| Working example 13 | $4.0 \times 10^{-9}$ | 99.6 | 0.72 | 99.7 | DMIB | 85.0 | PSf | 15.0 | Substrate formed through paper machine method used |
| Working example 14 | $4.1 \times 10^{-9}$ | 99.7 | 0.74 | 99.6 | DMIB | 85.0 | PSf | 15.0 | Substrate fiber orientation ratio changed |
| Working example 15 | — | — | 1.36 | 99.4 | DMIB | 85.0 | PSf | 15.0 | Conditions for formation of separation functional layer changed |
| Working example 16 | $53.3 \times 10^{-9}$ | 98.4 | — | — | DMIB/DMF | 25.0/50.0 | PVDF | 18.0 | Substrate fiber size, etc. changed |
| Working example 17 | $50.1 \times 10^{-9}$ | 98.8 | — | — | DMIB/DMF | 10.0/65.0 | PVDF | 18.0 | — |
| Working example 18 | $2.1 \times 10^{-9}$ | 99.7 | — | — | DMIB/DMF | 20.0/60.0 | PVDF | 20.0 | Hollow fiber membrane |
| Comparative example 1 | $1.9 \times 10^{-9}$ | 99.8 | 0.71 | 99.7 | DMF | 85.0 | PSf | 15.0 | — |
| Comparative example 2 | $2.6 \times 10^{-9}$ | 99.7 | 0.70 | 99.7 | NMP | 85.0 | PSf | 15.0 | — |
| Comparative example 3 | $16.6 \times 10^{-9}$ | 94.5 | — | — | DMSO | 85.0 | PSf | 15.0 | — |
| Comparative example 4 | $3.5 \times 10^{-9}$ | 99.5 | 0.25 | 86.2 | DMAc | 85.0 | PSf | 15.0 | — |
| Comparative example 5 | $1.7 \times 10^{-9}$ | 99.4 | 0.52 | 74.1 | DMF | 85.0 | PSf/PES | 5.0/10.0 | — |
| Comparative example 6 | — | — | 1.12 | 99.6 | DMF | 85.0 | PSf | 15.0 | Conditions for formation of separation functional layer changed |
| Comparative example 7 | $45.4 \times 10^{-9}$ | 98.6 | — | — | DMF | 75.0 | PVDF | 18.0 | — |
| Comparative example 8 | $1.5 \times 10^{-9}$ | 99.7 | — | — | DMF | 80.0 | PVDF | 20.0 | Hollow fiber membrane |

The expressions "DMIB/DMF" and "70/15 (wt %)" in working example 4 signify that a mixed solvent of DMIB and DMF was used and that the concentrations of DMIB and DMF in the polymer solution were 70 wt % and 15 wt %, respectively. This also applies to all similar expressions in the table, including both resins and solvents. In working example 3, for instance, the concentrations of PSf and PES in the polymer solution were 5 wt % and 10 wt %, respectively.

The meaning of the abbreviations are provided below.
DMIB: N,N-dimethyl isobutyl amide
DMF: N,N-dimethyl formamide NMP: N-methyl-2-pyrolidone
DMSO: Dimethyl sulfoxide
DMAc: N,N-dimethyl acetamide
NIB: N-methyl isobutyl amide
PSf: Polysulfone
PES: Polyethersulfone
PVDF: Polyvinylidene fluoride
PSt: Polystyrene

INDUSTRIAL APPLICABILITY

Separation membranes of the present invention combine high permeability and high solute removal performance without the use of new additives or a post-membrane production modification treatment step. In particular, they can be advantageously used in the desalination of brackish water or seawater, wastewater treatment, and production of drinking water.

EXPLANATION OF ALPHANUMERICAL SYMBOLS 1a, 1b, 1c, 1d: Separation membranes
2a, 2b: Substrate
3a, 3b, 3c: Porous layer
4a: Separation functional layer
5: Supply-side surface of separation membrane
6: Permeate-side surface of separation membrane
7: Separation membrane element
8: Feedwater channeling medium (net)
9: Permeate channeling medium (tricot)
10: Envelope-style folded membrane
11: Hole
12: Perforated water collecting pipe
13: Source fluid
14: Permeate fluid
15: Concentrate fluid
16: Permeate fluid outlet
17: Concentrate fluid outlet

The invention claimed is:

1. A manufacturing method for a separation membrane for water treatment comprising:
   (a) a step for forming porous layer by a phase separation method from a solution containing a resin and at least either N,N-disubstituted isobutylamide or N-monosubstituted isobutylamide, and
   (b) a step for forming a separation functional layer containing a cross-linked polyamide by carrying out, on the surface of the porous layer, interfacial polycondensation involving an aqueous solution containing a polyfunctional amine and a solution containing a water-immiscible organic solvent and polyfunctional acid halide.

2. A manufacturing method for a separation membrane for water treatment as described in claim 1 wherein the solution of step (a) contains at least one compound chosen from the group consisting of N,N-dimethyl isobutyl amide N,N-diisopropyl isobutyl amide, and N,N-bis(2-ethylhexyl) isobutyl amide as the N,N-disubstituted isobutylamide.

3. A manufacturing method for a separation membrane for water treatment as described in claim 1 wherein the solution of step (a) contains at least one compound chosen from the group consisting of N-methyl isobutylamide, N-butyl isobutyl amide, N-pentylisobutyl amide, N-isopropyl isobutyl amide, N-phenylisobutyl amide, N-benzyl isobutyl amide, N-(2-phenyl ethyl) isobutyl amide, N-vinyl isobutylamide, and N-(3-butenyl) isobutyl amide as the N-monosubstituted isobutylamide.

4. A manufacturing method for a separation membrane for water treatment as described in claim 1 wherein the solution of step (a) contains at least one compound chosen from the group consisting of polysulfone, polyacrylonitrile, polyamide, polyester, polyvinyl alcohol, polyphenylene sulfide sulfone, polyphenylene sulfone, polyphenylene sulfide, polyethersulfone, polyvinylidene fluoride, cellulose acetate, and polyvinyl chloride as the resin.

5. A manufacturing method for a separation membrane for water treatment as described in claim 1 wherein the phase separation method is either a non-solvent-induced phase separation method or a thermally induced phase separation method.

6. A manufacturing method for a separation membrane for water treatment as described in claim 1 wherein the separation membrane is either a flat membrane or a hollow-fiber membrane.

7. A manufacturing method for a separation membrane for water treatment as described in claim 1 wherein the porous layer is formed over a substrate in step (a).

8. A manufacturing method for a separation membrane for water treatment as described in claim 7 wherein the substrate is a long-fiber nonwoven fabric.

9. A manufacturing method for a separation membrane for water treatment as described in claim 1 wherein the separation membrane exhibits a permeate flux of 0.7 $m^3/m^2$/day or more when seawater with a temperature of 25° C., a pH of 6.5, and a TDS concentration of 3.5 wt % is passed through it at an operating pressure of 5.5 MPa.

10. A manufacturing method for a separation membrane for water treatment as described in claim 1 wherein the separation membrane exhibits a permeate flux of 1.4 $m^3/m^2$/day or less when seawater with a temperature of 25° C., a pH of 6.5, and a TDS concentration of 3.5 wt % is passed through it at an operating pressure of 5.5 MPa.

* * * * *